US010266021B2

(12) United States Patent
Coles et al.

(10) Patent No.: US 10,266,021 B2
(45) Date of Patent: Apr. 23, 2019

(54) TIRE CHAIN AND COMPONENTS THEREOF

(71) Applicant: Pro Vide Australia Pty Ltd, Welshpool DC, Western Australia (AU)

(72) Inventors: Rodney Edward Coles, South Perth (AU); Owen Douglas Coles, Welshpool DC (AU)

(73) Assignee: Pro Vide Australia Pty Ltd, Welshpool DC, Western Australia (AU)

( * ) Notice: Subject to any disclaimer, the term of this patent is extended or adjusted under 35 U.S.C. 154(b) by 0 days.

(21) Appl. No.: 15/377,770

(22) Filed: Dec. 13, 2016

(65) Prior Publication Data

US 2017/0087945 A1   Mar. 30, 2017

Related U.S. Application Data

(63) Continuation of application No. 14/371,785, filed as application No. PCT/AU2013/000006 on Jan. 8, 2013, now abandoned.

(30) Foreign Application Priority Data

Jan. 11, 2012   (AU) ................................ 2012900103

(51) Int. Cl.
  *B60C 27/08*  (2006.01)
  *F16G 15/04*  (2006.01)
  *B60C 27/06*  (2006.01)

(52) U.S. Cl.
  CPC .......... *B60C 27/086* (2013.01); *B60C 27/063* (2013.01); *F16G 15/04* (2013.01); *Y10T 29/49721* (2015.01); *Y10T 29/49826* (2015.01)

(58) Field of Classification Search
  CPC ..... B60C 27/067; B60C 27/068; B60C 27/08; B60C 27/083; B60C 27/086
  See application file for complete search history.

(56) References Cited

U.S. PATENT DOCUMENTS

| 649,460 | A | * | 5/1900 | Jordan | F16B 45/04 |
| | | | | | 24/582.11 |
| 1,776,515 | A | * | 9/1930 | Leahy | F16G 13/14 |
| | | | | | 411/354 |
| 1,787,926 | A | * | 1/1931 | Allen | F16G 15/02 |
| | | | | | 59/85 |
| 2,382,344 | A | * | 8/1945 | St Pierre | F16G 15/02 |
| | | | | | 59/85 |

(Continued)

FOREIGN PATENT DOCUMENTS

| DE | 2015-00108 | * 12/2014 |
| EP | 0108154 B1 | 12/1986 |
| GB | 1371040 A | 10/1974 |

OTHER PUBLICATIONS

International Search Report for PCT/AU2013/000006, dated Apr. 18, 2013; ISA/AU.

*Primary Examiner* — Jacob B Meyer
(74) *Attorney, Agent, or Firm* — Suzannah K. Sundby, Esq.; Canady + Lortz LLP

(57) ABSTRACT

A link member for a tire chain, comprising a body including a cavity for receiving a portion of a ring element therein, the body also including an opening for inserting the ring element into the cavity, said body further being adapted to receive a retaining member for closing the opening and retaining the ring element in the cavity.

16 Claims, 15 Drawing Sheets

(56) References Cited

U.S. PATENT DOCUMENTS

| | | | | |
|---|---|---|---|---|
| 2,398,897 | A * | 4/1946 | St Pierre | F16G 15/02 59/85 |
| 2,537,405 | A * | 1/1951 | Gilbert | F16G 15/02 59/85 |
| 3,027,615 | A * | 4/1962 | Forney | F16G 15/04 24/116 R |
| 3,595,292 | A * | 7/1971 | Muller | B60C 27/08 152/243 |
| 3,603,371 | A | 9/1971 | Muller | |
| 3,614,971 | A * | 10/1971 | Muller | B60C 27/08 152/243 |
| 3,709,275 | A | 1/1973 | Muller | |
| 3,714,975 | A | 2/1973 | Muller | |
| 3,785,422 | A * | 1/1974 | Witzel | B60C 27/08 152/241 |
| 3,799,232 | A * | 3/1974 | Schnurle | B60C 27/08 152/231 |
| 3,835,908 | A * | 9/1974 | Rieger | F16G 15/02 152/243 |
| 4,020,885 | A | 5/1977 | Sato | |
| 4,102,378 | A | 7/1978 | Weidler | |
| 4,147,023 | A | 4/1979 | Weidler | |
| 4,274,461 | A | 6/1981 | Yamamoto | |
| 4,306,605 | A | 12/1981 | Weidler et al. | |
| 4,357,975 | A | 11/1982 | Baldry | |
| 4,391,313 | A | 7/1983 | Weidler | |
| 4,649,977 | A * | 3/1987 | Weidler | B60C 27/08 152/171 |
| 4,860,567 | A | 8/1989 | Askey et al. | |
| 5,878,565 | A * | 3/1999 | Grootveld | F16G 15/04 59/78 |
| 5,974,779 | A * | 11/1999 | Orscheln | F16G 15/02 59/84 |
| 7,155,895 | B2 * | 1/2007 | Moehnke | F16G 15/04 59/84 |
| 7,930,874 | B2 * | 4/2011 | Rieger | B60C 27/08 152/231 |
| 9,079,463 | B2 * | 7/2015 | Walenta | B60C 27/08 152/231 |
| 9,670,987 | B1 * | 6/2017 | Stolz | F16G 15/02 |

* cited by examiner

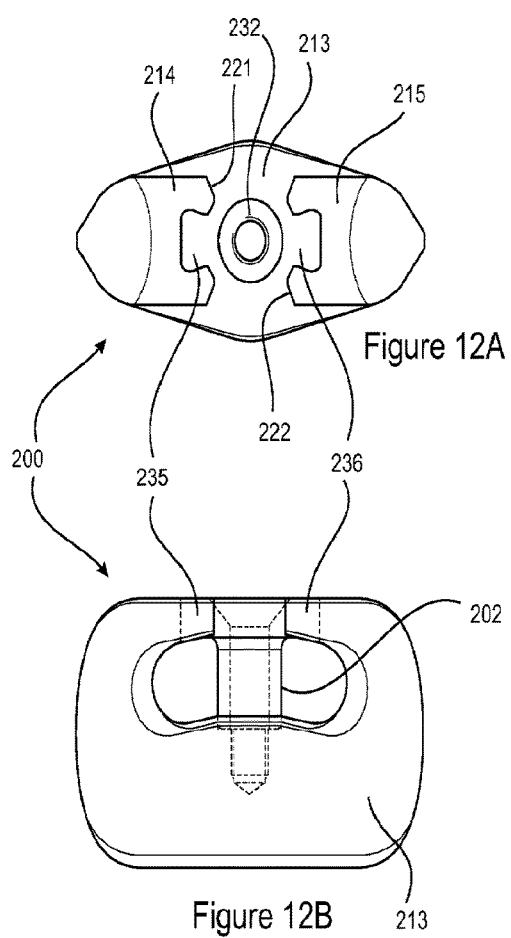
Figure 12A
Figure 12B
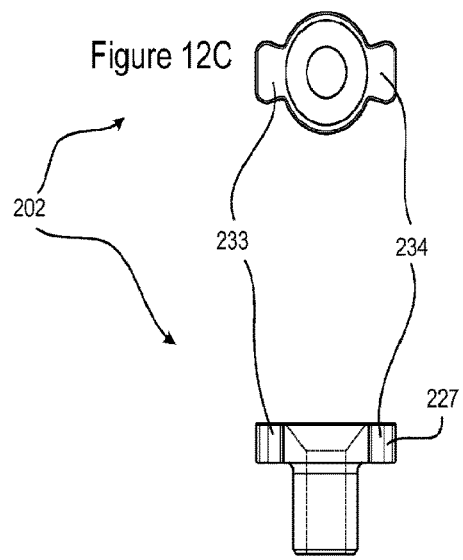
Figure 12C
Figure 12D

TIRE CHAIN AND COMPONENTS THEREOF

FIELD OF THE INVENTION

The present invention relates to a chain for use on tyres and specifically tyres for large vehicles such as those used at mine sites, earthmoving and other large-scale industrial locations. The present invention also relates to tyre chain units and other components of tyre chains, to methods of forming a tyre chain as well as tyres fitted with the tyre chains and methods of servicing tyre chains.

BACKGROUND TO THE INVENTION

Large vehicles used in industrial applications such as at mine sites use large tyres which are very expensive, wear out quickly and are subject to damage from cuts and penetrations. Tyre chains are used to increase traction, protect and prolong the life of these tyres, which has been particularly important during recent years where there has been a shortage of such tyres.

The tyre chains that are currently used comprise a number of chain links connected by welded chain rings usually between two and four chain links per chain ring to provide an array of chain rings and links between these chain rings. Some of the chain links are ground engaging, and provide traction with the ground and need to incorporate the required wear material to continually perform this function.

The current practice is to use butt-welded chain rings of circular cross-section as the joining mechanism to assemble the chain. The use of butt welding results in a raised protrusion across a portion of the chain ring as a consequence of the welding process. The presence of this raised protrusion can hamper and or otherwise interfere with movement or rotation of the chain ring relative to the chain links when in service. This can reduce chain ring rotation and result in wear points forming on the chain ring at the specific points where the chain links contact the chain rings. Furthermore, wear is not evenly shared around the entire circumference of the chain ring.

Localised ring point wearing causes rapid dimensional expansion of the overall tyre chain assembly which then requires varying continual manual service adjustments so that the tyre chain assembly continues to stay within tension specification and correct running position on the tyre: this takes repeated servicing, time and effort. Eventually the whole tyre chain needs to be removed from the wheel, shortened and refitted to enable it to reach its end of service life or be replaced.

In addition, once the chain ring wears to the extent that the wearing extends past the centre line of the ring cross section at these focused ring wear points, a further rapid acceleration of wear results due to the reduction of actual surface area contact between the ring and the link engagement, thus increasing the surface load and wear rate.

The use of butt welding also places limitations on the dimensions that can be utilised for the component dimensions directly affecting area of the engagement surface between the chain link and chain ring as extra chain ring material length is required to facilitate the actual welding process of the ring during assembly of the chain assembly and the dimensions of the chain links are limited at the point where they are attached to the ring because they need to be bunched together to facilitate welding of the ring and also a further portion of the ring length is sacrificed for the welding process to take place. All these limitations imposed on the component dimensions increase the rate of wear between the link and the ring at the points where the chain link and chain ring engage.

The rate of wear dictates the rate at which the tyre chain tension needs to be manually adjusted, and also the service life of the tyre chain.

The materials that can be used for the chain ring are also limited by the need to use a welding process.

In certain applications it is critical that the tyre chain manufacturer needs to produce tyre chains that can be fitted onto wheel assemblies that are restricted in circumference due to clearance restrictions on the machines the wheels will be fitted to, such as the machines mudguards, framework and componentry. An important factor when producing chain links incorporating ground engaging wear material is the ratio between the height of the wear material portion compared to the overall height of the link. The current use of butt welded rings and the resulting raised protrusions on the ring surfaces around the weld area in the tyre chain assembly means that link cavities that contain the rings are generally enlarged to encourage welded ring rotation resulting in lower ratio of wear material height for a given link height.

Once the whole tyre chain is assembled then the whole tyre chain assembly has to undergo a heat treatment, quenching and tempering process, but, because the rings and links are constructed of different materials and also comprise varying mass and dimensions, there is a compromise in the whole process.

Any final processes are also limited, such as the application of performance enhancing treatments, shipping/storage preservatives, most surface coatings or product visual enhancements, can only be done once the tyre chain has been welded into an assembly and heat treated.

Welding processes during chain construction are hazardous, physically demanding, labour intensive, energy expensive and have extensive health and safety implications because of the heat, noise, dust, toxins, by-products and the like that are produced as part of the process. Tyre chain assemblies currently in use can be in excess of 5000 kg.

The process of welding and assembling the tyre chain requires repeated movements of the assembly, it is physically demanding and time consuming, and in larger applications chains need to be done in multiple sections which are then joined together with non-rotating rings. The life of the chain is also dictated by the life of the weakest or most worn component and often an end of service life chain will have a large number of rings and links which are still capable of being returned to service. Current welded tyre chain design places high costs and severe restrictions on the re-use of any salvageable components or sections of the scrapped used assembly.

The current practice of utilising welded rings for assembling chains means that chain assembly component specifications and chain assembly dimensions are set to prior to chain assembly manufacture and importers, dealers, distributors and service centres have to pre-empt demand for sizes and quantities and also stock chain assemblies to suit many different sizes of tyres and applications. There are significant costs and delays when ordering non-stocked or custom-built chains from tyre chain manufacturers, importers or dealers.

The present invention seeks to provide a tyre chain that addresses or at least partially ameliorates one or more of the problems discussed above.

SUMMARY OF THE INVENTION

The present invention provides a link member for a tyre chain, comprising a body including a cavity for receiving a portion of a ring element therein, the body also including an opening for inserting the ring element into the cavity, said body further being adapted to receive a retaining member for closing the opening and retaining the ring element in the cavity.

The present invention also provides a seamless ring element for a tyre chain.

Further, the present invention provides a tyre chain unit comprising:

(i) a link member for a tyre chain, comprising a body including a cavity for receiving a portion of a ring element therein, the body also including an opening for inserting the ring element into the cavity, said body further being adapted to receive a retaining member for closing the opening and retaining the ring element in the cavity; and (ii) at least one seamless ring element slidably attached to the link member.

Still further, the present invention provides a tyre chain comprising a link member of the present invention.

The present invention also provides a method of forming a tyre chain, the method including the step of attaching a first link member to a first seamless ring element.

Further, the present invention provides a tyre including a tyre chain of the present invention.

BRIEF DESCRIPTION OF DRAWINGS

FIG. 12A is schematic side view of a link member according to another embodiment of the present invention in the form of a chain link that includes an alternative sleeve member in the form of an insert with lugs that are received in compatible recesses in the chain link;

FIG. 12B is a plan view of the chain link in FIG. 12A in the open position i.e. without the insert;

FIGS. 12C and 12D are plan and side views respectively of the insert shown in FIG. 12A;

DETAILED DESCRIPTION OF THE INVENTION

Figure 1:
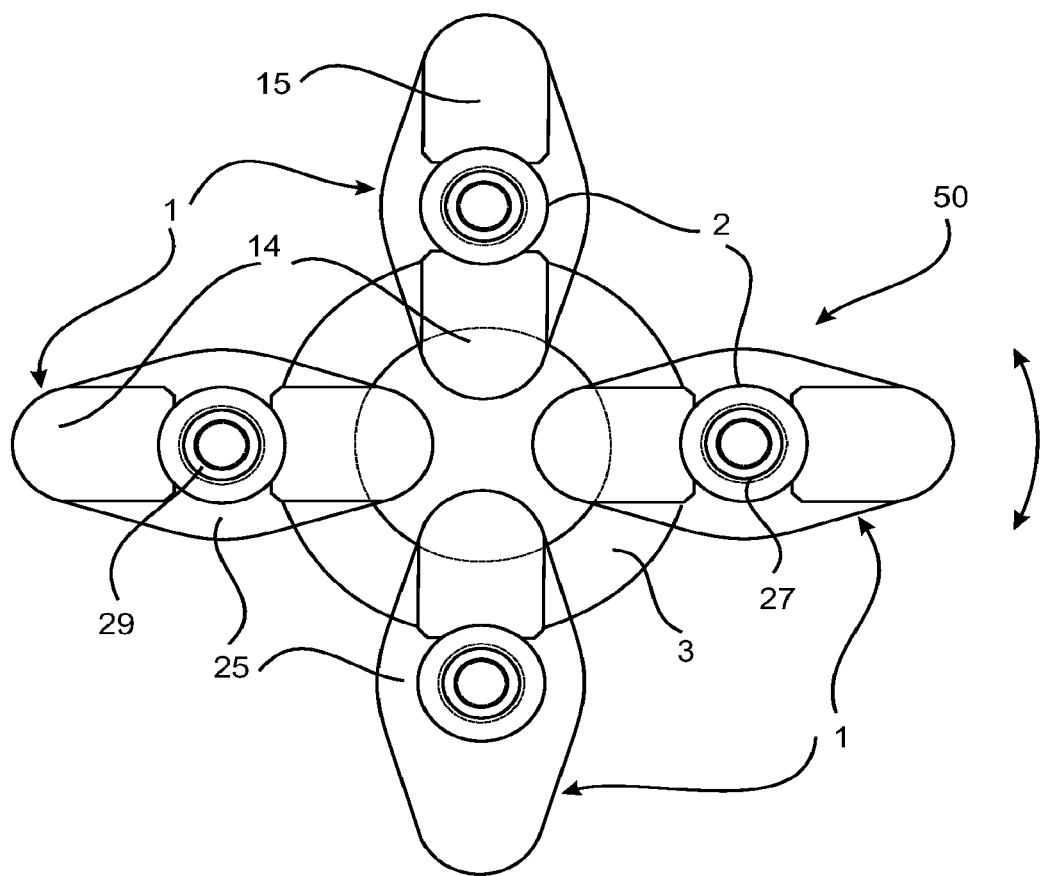
FIG. 1 is a schematic representation of a tyre chain unit according to one embodiment of the present invention, including a single ring element in the form of a chain ring and attached link elements in the form of four chain links spaced substantially equidistantly around the chain ring.

According to a first aspect of the invention, there is provided a link member for a tyre chain, comprising a body including a cavity for receiving a portion of a ring element therein, the body also including an opening for inserting the ring element into the cavity, said body further being adapted to receive a retaining member for closing the opening and retaining the ring element in the cavity.

Preferably, the body includes a ground engaging portion that is adapted to contact the ground in use.

Preferably, the ground engaging portion incorporates wear material. The ground engaging portion may be varied and is designed according to the end use requirements. In this regard, tyre chains are used in a variety of environments with differing ground conditions and thus the choice of wear material and the amount of wear material employed can be varied as required. Preferably, the ground engaging portion comprises at least about 45%-60% of the overall height of the link member. For example, when the overall height of the link member is 69 mm, the ground engaging portion, including the wear material may be about 37 mm which equates to about 54% of the overall height of the link member.

Preferably, the cavity is adapted to receive a portion of two ring elements.

Preferably, the cavity is adapted to slidably receive the portion of the ring element. Even more preferably, the cavity is adapted to enable the entire ring element to pass through it. The passage of the ring element through the cavity ensures that the ring element wears more evenly.

Preferably, the opening is on the surface of the link member that abuts with the tyre when the tyre chain is in use.

Preferably, the link member further comprises a retaining means. Thus, the present invention also provides a link member for a tyre chain, comprising a body including a cavity for receiving a portion of a ring element therein, the body also including an opening for inserting the ring element into the cavity, said link member further comprising a retaining member for closing the opening and retaining the ring element in the cavity.

Preferably, the retaining member is adapted to removably engage with the link member. For example the retaining member may be threaded or include another means for it to be engaged and disengaged from the link member. Alternatively, the retaining member may be a welded or pinned insert.

The retaining member may comprise a cap or head portion and a shaft portion. Preferably, the head and shaft portions are configured such that when the retaining member is received in the body of the link member the cap or head portion closes the opening for the ring element and retains the ring element in the cavity.

Preferably, the cap or head portion of the retaining member is counter sunk or flush with the surface of the link member when the retaining member is engaged therein.

Preferably, the cap or head portion includes a tool engaging portion and the shaft portion includes a threaded portion that engages with the body of the link member via a suitably configured bore, such a threaded bore, in the body of the link member.

Preferably, the tool engaging portion is compatible with a hex key or some other screw or bolt driving tool.

The link member may further comprise a sleeve member for co-operating with the retaining member for closing the opening and retaining the ring element in the cavity. Thus, the present invention also provides a link member for a tyre chain, comprising a body including a cavity for receiving a portion of a ring element therein, the body also including an opening for inserting the ring element into the cavity, said link member further comprising a retaining member for closing the opening and retaining the ring element in the cavity and a sleeve member for co-operating with the retaining member for closing the opening and retaining the ring element in the cavity.

The sleeve member may be varied and its shape and form are dependent on the shape and form of the retaining member. Preferably, the sleeve member is an elongate body having a bore provided along its length, said bore being adapted to receive the retaining means therethrough. Preferably, the sleeve member is adapted to removably engage with the link member. For example the sleeve member may be threaded or include another means for it to be engaged and disengaged from the link member.

Preferably, the sleeve member is configured such that when the sleeve member is received in the body of the link member it closes the opening for the ring element and, once the retaining member is inserted through the sleeve member the ring element is retained in the cavity. Preferably, the sleeve member includes a countersunk portion such that when the retaining member is inserted to retain the ring element in the cavity the retaining member is flush or countersunk from the surface of the link member.

Preferably, the retaining means and/or the sleeve member defines first and second apertures in said cavity, when inserted in the link member, each of said first and second apertures being adapted to slidably receive first and second ring elements therein.

Preferably, the cavity has an internal curved surface, portions of which define internal curved surface segments.

Preferably, the internal curved surface segments are curved in all dimensions to cooperate with the radius of curvature of the ring element.

According to a second aspect of the present invention there is provided a seamless ring element for a tyre chain.

For the purposes of the present invention the term "seamless" means jointless. Even more preferably, the term seamless means smooth surfaced insofar as there is no projection or irregularity that can increase the friction between the ring member and another member it is in contact with at certain points of the ring member. The seamless ring elements of the present invention may be unitary, one piece and/or formed as a single unit.

Preferably, the seamless ring elements are weldless. Even more preferably the seamless ring elements are forged, machined or forged and machined as a unitary member.

Preferably, the seamless ring elements are circular or generally circular.

According to a third aspect of the invention, there is provided a tyre chain unit comprising:
 (i) a link member for a tyre chain, comprising a body including a cavity for receiving a portion of a ring element therein, the body also including an opening for inserting the ring element into the cavity, said body further being adapted to receive a retaining member for closing the opening and retaining the ring element in the cavity; and
 (ii) at least one seamless ring element slidably attached to the link member.

Preferably, the tyre chain unit comprises two seamless ring elements attached to the link member.

According to a fourth aspect of the present invention there is provided a tyre chain comprising a link member of the present invention.

Preferably the link member includes a ground engaging portion.

Preferably the tyre chain further comprises a seamless ring element of the present invention.

The present invention also provides a tyre chain comprising a first link member including a ground engaging portion and a second link member. Preferably, the tyre chain is configured such that, in use, the second link member is positioned adjacent to the side wall of the surface of the tyre.

Preferably, the tyre chain further comprises a tensioning means such as a tensioning chain.

The present invention also provides a tyre chain comprising a seamless ring element of the present invention.

According to a fifth aspect of the present invention there is provided a method of forming a tyre chain, the method including the step of attaching a first link member to a first seamless ring element.

Preferably, the method further comprises the step of attaching at least one additional link member to the first seamless ring element.

Preferably, the method further comprises the step of attaching at least one additional seamless ring element to the first or additional link member.

According to a sixth aspect of the present invention there is provided a tyre including a tyre chain of the present invention.

The present invention also provides a method of fitting a tyre chain to a tyre comprising the steps (i) providing a tyre chain according to the present invention and (ii) fitting the tyre chain to a tyre.

The present invention also provides a method for servicing a tyre chain including a link member of the present invention including a retaining member and a ring element, the method comprising the steps (i) removing the retaining member from the link member; and (ii) detaching the link member from the ring element.

The method of servicing a tyre chain according to the present invention can be used to conveniently replace one or more components of a tyre chain.

The present invention has numerous advantages many of which are related to its use of seamless ring elements. Seamless ring elements do not have raised protrusions and discontinuities that cause premature wear and failure of existing tyre chain assemblies. In this regard, the seamless ring elements allows for the link members mounted thereon to slide and move more freely around, when in use. This helps maintains the tyre chain's structural integrity and strength and limits internal diameter wear and corresponding dimensional expansion of the entire tyre chain. This increases the interval between servicing adjustments and chain assembly shortening requirements during service life.

The use of seamless ring elements enables minimum clearances and tolerances to be run between the ring elements and the link elements while still achieving ring rotation. This eliminates hammering and peining effects between the components when in use. Reduced clearances also enable a reduction in the overall dimensions of each component. This in turn enables more link elements per square meter of tyre surface to be provided which reduces individual component wear. Reduced clearances also allow a higher ratio of wear material to be contained within a given link element. All of these factors contribute to an extended service life and increases protection of the tyres from failures caused by penetration damage from rocks and other debris.

In addition, the use of seamless ring elements and/or the other aspects of the present invention:

enables the most suitable ring metallurgy for service life to be selected, thus substantially lessening ring failure in service due to weld failure, fatigue, cracking etc. as well as reducing the manual servicing requirements from chain assembly dimensional expansion and repairs during service life.

ensures none of the by-products of a welding process are produced, and there is a huge reduction in energy consumption with the use of machining processes replacing the welded ring process.

is cleaner, safer and more operator and environmentally friendly.

enable very small chain link cavity to ring clearance tolerances without affecting chain ring rotation and the increased wear associated with limited ring rotation. Thus any given overall link height can contain a higher wear material height to link height ratio resulting in a longer life of the tyre chain assembly.

allows for tyre chains to be more easily assembled from individually stocked components, either at the manufacturer or through to the point of demand, and provides manufacturing, environmental, marketing, distribution and performance advantages enables the user to mix and match chain componentry and build custom chains to enhance chain performance for ground conditions and usage application at each location.

Thus, the present invention will lead to greater acceptance of the use of tyre chains throughout the world and a corresponding reduction in tyre manufacture quantity and used tyre disposal.

Preferably, tyre chains according to the present invention require little or no movement or realignment of the chain assembly as it is assembled in its final form and without repositioning it can be made into a complete one piece regardless of the weight of the completed chain assembly. There is also no need to install non-rotating connecting rings in the tyre chain.

The present invention can enable the use of heat treatment, quenching and tempering of individual components and other technical processes to be specifically tailored to suit each type of component. It also eliminates difficulties associated with handling tyre chain assemblies during construction, heat treatment, quenching and tampering, performance enhancement treatments, cleaning and coating, packaging, transport and warehousing phases of the chain production and distribution.

The invention allows for a broader range of surface treatments, enhancements and/or coating of each component before assembly. This allows a mix of treatments in the same tyre chain assembly which improves corrosion and chain performance, and also allows greater scope for marketing, like multiple colours in one assembly, and unique brand recognition with superior visual appearance.

The present invention also enables the surface area of engagement between the ring and the links to be increased by increasing the dimensions of the ends of the chain links within set existing maximum dimensions. This substantially reduces the dimensional growth rate of the tyre chain during its operational life and significantly reduces service adjustment frequency.

The present invention enables distributors, dealers and end users to stock only individual chain components, and gives them the ability to readily, and easily, assemble multiple configurations and chains sizes on demand with a few basic hand tools. This eliminates the need to stock fixed size and also eliminates manufacturing time delays when ordering. It also eliminates having slow moving or dead stock in inventory.

The present invention enables distributors, dealers or service centre the ability to mix and match chain components to create and test trial designs to enhance performance suiting particular client applications and operational environments.

The design also makes it possible to carry the components on smaller mobile units to custom build chains to any specifications on site, as carrying premade tyre chain assemblies to cover all different demand contingencies would involve huge costs, requires huge and heavy transport, and massive investment.

The invention allows easy refurbishment of an entire tyre chain using a few basic hand tools to replace the worn out sections off the chain and the tyre chain can be returned to service. This process can be undertaken in situ.

Furthermore, it provides significant environmental gains from eliminating welding requirements, refurbishment of existing chain structures and reducing chain and tyre waste requirements.

General

Those skilled in the art will appreciate that the invention described herein is susceptible to variations and modifications other than those specifically described. The invention includes all such variation and modifications. The invention also includes all of the steps and features referred to or indicated in the specification, individually or collectively and any and all combinations or any two or more of the steps or features.

Each document, reference, patent application or patent cited in this text is expressly incorporated herein in their entirety by reference, which means that it should be read and considered by the reader as part of this text. That the document, reference, patent application or patent cited in this text is not repeated in this text is merely for reasons of conciseness. None of the cited material or the information contained in that material should, however be understood to be common general knowledge.

The present invention is not to be limited in scope by any of the specific embodiments described herein. These embodiments are intended for the purpose of exemplification only. Functionally equivalent products and methods are clearly within the scope of the invention as described herein.

The invention described herein may include one or more range of values (e.g. size etc). A range of values will be understood to include all values within the range, including the values defining the range, and values adjacent to the range which lead to the same or substantially the same outcome as the values immediately adjacent to that value which defines the boundary to the range.

Throughout this specification, unless the context requires otherwise, the word "comprise" or variations such as "comprises" or "comprising", will be understood to imply the inclusion of a stated integer or group of integers but not the exclusion of any other integer or group of integers.

Other definitions for selected terms used herein may be found within the detailed description of the invention and apply throughout. Unless otherwise defined, all technical terms used herein have the same meaning as commonly understood to one of ordinary skill in the art to which the invention belongs.

DESCRIPTION OF THE PREFERRED EMBODIMENTS

The present invention will now be described more fully hereinafter with reference to the attached drawings in which certain preferred embodiments of the invention are shown. This invention may, however, be embodied in many different forms and should not be construed as limited to any of the embodiments set forth herein; rather, the embodiments are provided so that this disclosure will be thorough and complete, and will fully convey the scope of the invention to those skilled in the art.

Figure 2:
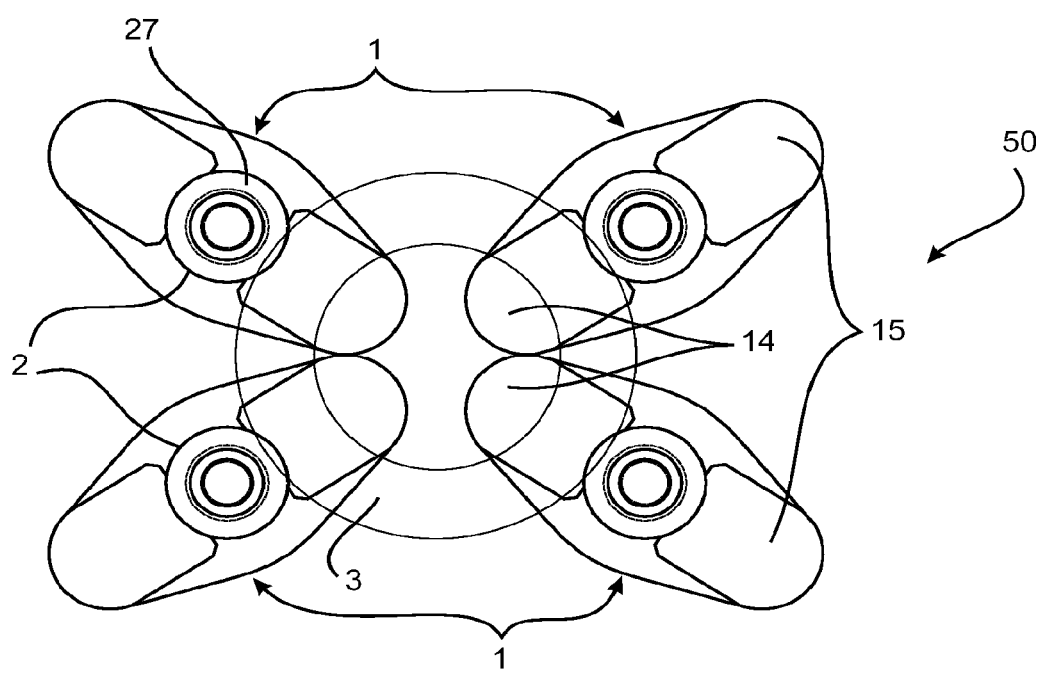
FIG. 2 is the same tyre chain unit as that shown in FIG. 1 but showing the chain links positioned differently on the chain ring.
Figure 3:
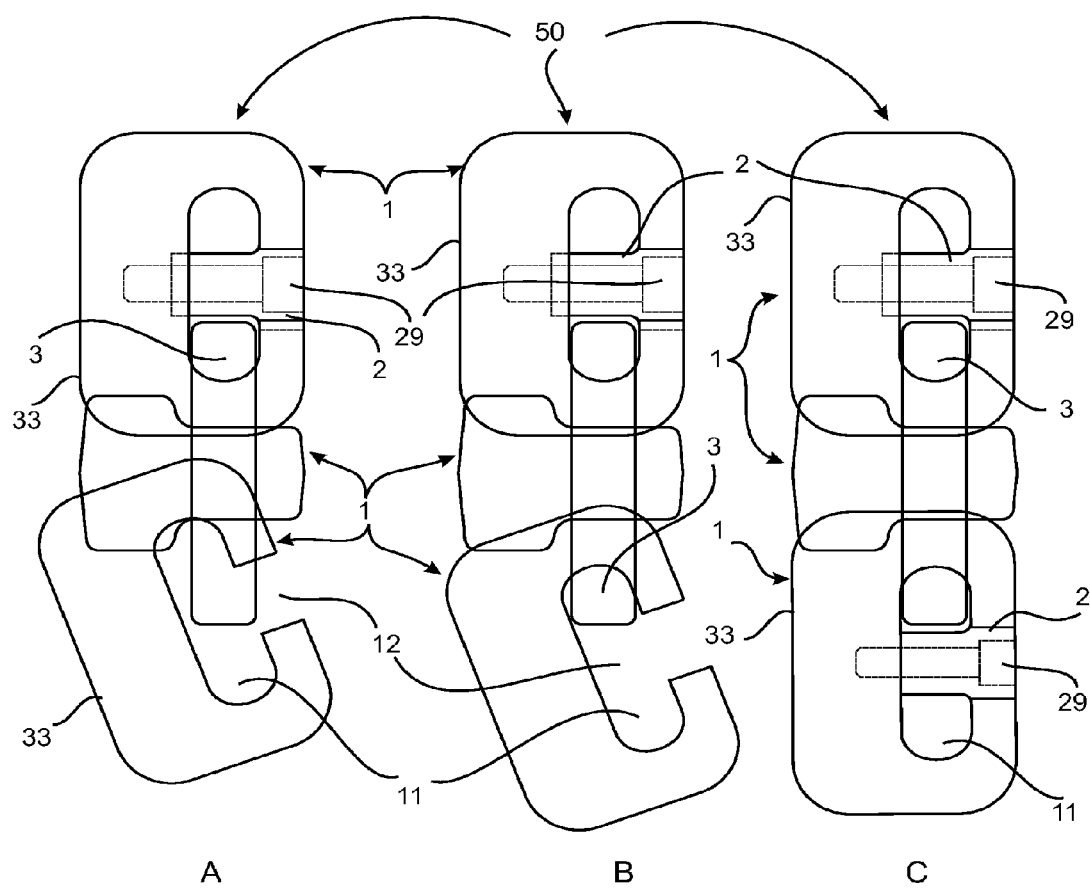
FIG. 3 is a series of schematic side views (A-C) of a tyre chain unit of the same form as that shown in FIGS. 1 and 2, showing how a chain link can be attached to the chain ring.

FIGS. 1 to 3 depict an embodiment of a tyre chain unit according to a third aspect of the present invention generally indicated by the numeral 50 and comprising an embodiment of a seamless ring element according to a second aspect of the present invention in the form of chain ring 3 (depicted in more detail in FIGS. 10A and 10B), attached to which are four link members according to a first aspect of the present invention in the form of chain links 1 (depicted in more detail in FIGS. 4 to 9B). Multiple tyre chain units 50 can be joined by attaching a chain link 1 to another adjacent chain ring (not shown) and so on to form an array of linked tyre chain units 50 which can together form a tyre chain according to an embodiment of a fourth aspect of the present invention that is depicted, fitted to a wheel assembly/tyre according to another embodiment of another aspect of the present invention, in FIG. 15.

The tyre chain unit 50 in FIGS. 1 and 2 is depicted from the side of the unit 50 that would, in use and when fitted, be located adjacent and in contact with the tread of a tyre. The chain links 1 and chain ring 3 are able to move relative to each other as indicated by the double-headed arrow in FIG. 1. FIG. 2 shows how the chain links 1 can be spaced non-equidistantly as may be required during use, production of a tyre chain and/or fitting of a tyre chain to a tyre or wheel assembly.

Each chain link 1 has a body including a cavity 11 for receiving a portion of a chain ring 3 and includes a ground engaging portion of wear material that provides a traction surface 33 that, when fitted to a tyre (not shown) and in use, contacts the ground and provides traction as well as protecting the tyre from damage.

The chain ring 3 is substantially circular and has a cross sectional profile which can be circular or non-circular. In the embodiment described with respect to the drawings herein the cross-sectional profile is non-circular, being semi-circular on one half of the chain ring 3 at the points where it engages or cooperates with the chain link 1, while having a square profile across the top and bottom of the rings. This can be seen best in FIGS. 4 and 10B. The use of this profile can increase the surface area of engagement between the chain ring 3 and the chain link 1 without increasing component weight and this in turn efficiently maintains the tyre chain's overall dimensions during and through service life. This substantially reduces the manual servicing adjustment requirements and increases service life. A square or varied profile of the chain ring 3 can also increase structural strength to resist bending, twisting or distortion.

Figures 10A, 10B:
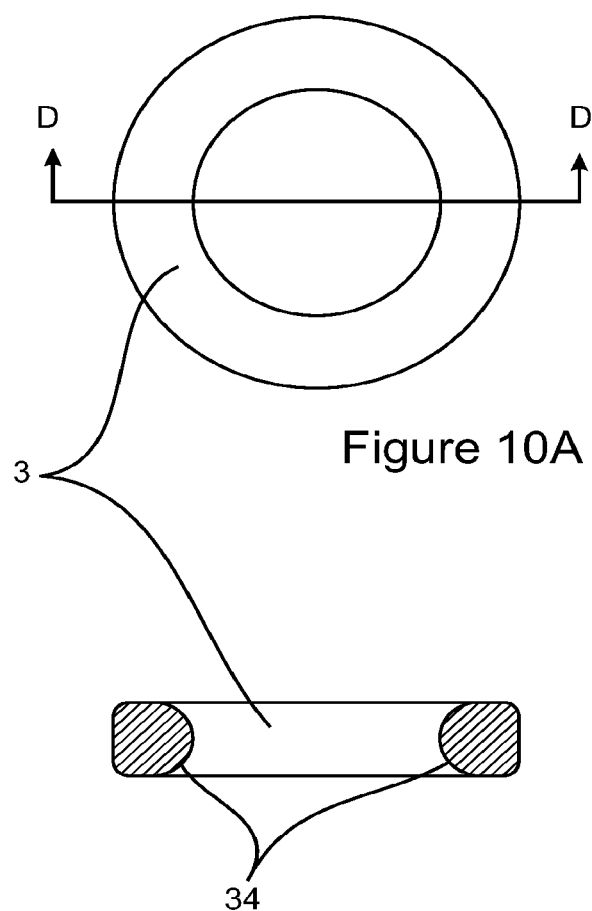
FIG. 10A is a plan view of a seamless ring element according to one embodiment of the present invention in the form of a chain ring.
FIG. 10B is a cross section view along the line D-D of the chain ring of FIG. 10A.

The chain ring 3, best depicted in FIGS. 10A and 10B, is formed as a single unitary piece without any seams or joints: that is, it is seamless. The chain ring 3 can be made using computer numerically controlled (CNC) machining or by forging or casting or any other suitable manufacturing method which enables the chain ring 3 to be formed as a single, seamless, unitary piece. Because the chain ring 3 is made as a single unitary piece, it is seamless with no weld joints, as with known tyre chains. The preferred methods of forming the chain ring 3 is to use forging and/or CNC machining of any suitable material such as steel. The use of CNC machines for machining single elements is well known in the art and need not be described in any further detail.

FIG. 3 demonstrates how a chain link 1 is attached to chain ring 3 where FIG. 3A shows an open chain link 1 (the lowermost chain link 1) being threaded onto chain ring 3 via opening 12 in the chain link 1. FIG. 3B shows the open chain link 1 supported on the chain ring 3 and FIG. 3C shows the chain link 1 attached to the chain ring 3 and the chain link 1 closed with a retaining member in the form of a bolt 29 that passes through the sleeve member in the form of insert 2 that is removably fixed to the chain link 1, and mates with a compatible threaded aperture (not shown) in the body of the chain link 1.

To assemble a tyre chain using the tyre chain units, four chain links 1 are placed on a chain ring 3 by inserting a portion the chain ring 3 into the respective cavity 11 via the respective openings 12 of each of the chain links 1. An insert 2 for each chain link 1 is then put in place and secured therein with a bolt 29 as described above so as to retain the chain ring 3 in place in each of the chain links 1. The chain links 1 must be placed so that they extend outwardly of the chain ring 3. This is repeated using further chain rings 3 and chain links 1 until the tyre chain is complete. Thus, it can be understood that a tyre chain can be constructed as required by simply using the correct number of chain rings 3 and chain links 1 to build up the tyre chain to the required size.

The structure, function and operation of the chain link 1 is best depicted in FIGS. 4 to 9B and is described in further detail below.

FIGS. 4 to 7 depicts a chain link generally indicated by the numeral 1 with a body having first and second side faces 6, 7, first and second ends 8, 9 a base 10, and a top surface 31 with an opening 12 (see FIG. 5) provided therein connecting to a cavity 11 provided in the body. The body has an exaggerated "C-shaped" vertical profile (best illustrated in FIG. 5) with the opening of the "C" corresponding to opening 12.

The body comprises a ground engaging portion in the form of traction block portion 13 formed of suitable wear material and first and second arcuate or curved arms 14, 15 which curve up from the traction block portion 13 to define the exaggerated C-shaped profile. The base 10 is thus part of the traction block portion 13 and provides the traction surface 33 for the chain link 1 and which, in use, abuts and engages the ground surface (not shown) to provide the traction therewith. The traction block portion 13, while of an elongate shape is not of a constant uniform width, being wider at its centre than at the ends. This can best be seen in FIGS. 6, 7 and 15.

Figure 5:
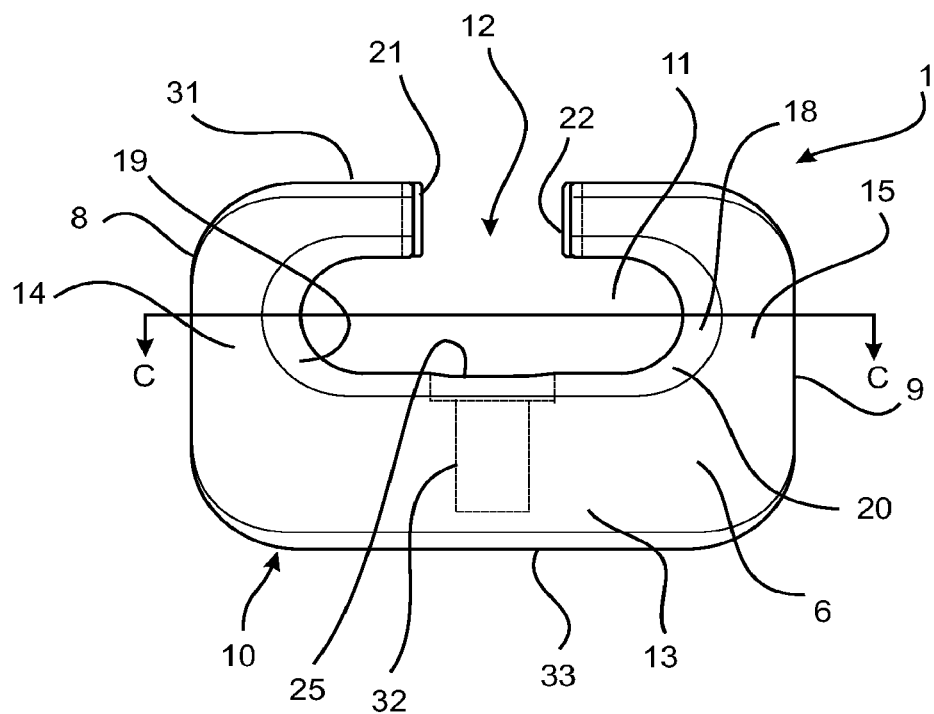
FIG. 5 is a schematic side view of the chain link of FIG. 4 in the open position i.e. without the retaining member or the insert.
Figure 6:
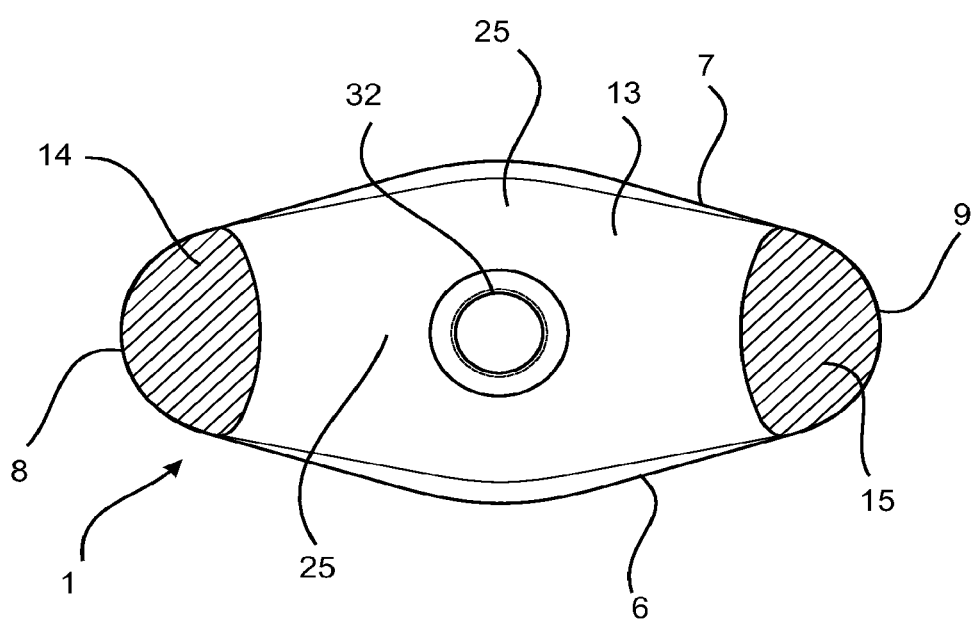
FIG. 6 is a cross section view of the chain link in FIG. 5 in the direction of line C-C of FIG. 5.

The cavity 11 has an internal surface 18 which includes internal curved surface segments 19, 20 of respective first and second arcuate or curved arms 14, 15. The internal curved surface segments 19, 20 are curved in three dimensions to provide a curved surface which will co-operate with the external curved substantially semi-circular surface 34 of the chain ring 3, when received therein, to further enable relative movement of the chain ring 3 with respect to the chain links 1. In this way, the internal cavity 11 has a substantially oval cross-sectional profile as best illustrated in FIG. 5.

When in place to close the chain link 1 the retaining member in the form of bolt 29 passes through the sleeve member in the form of insert 2 that abuts a recess 25 in the internal surface 18—as described in further detail below.

Figure 7:
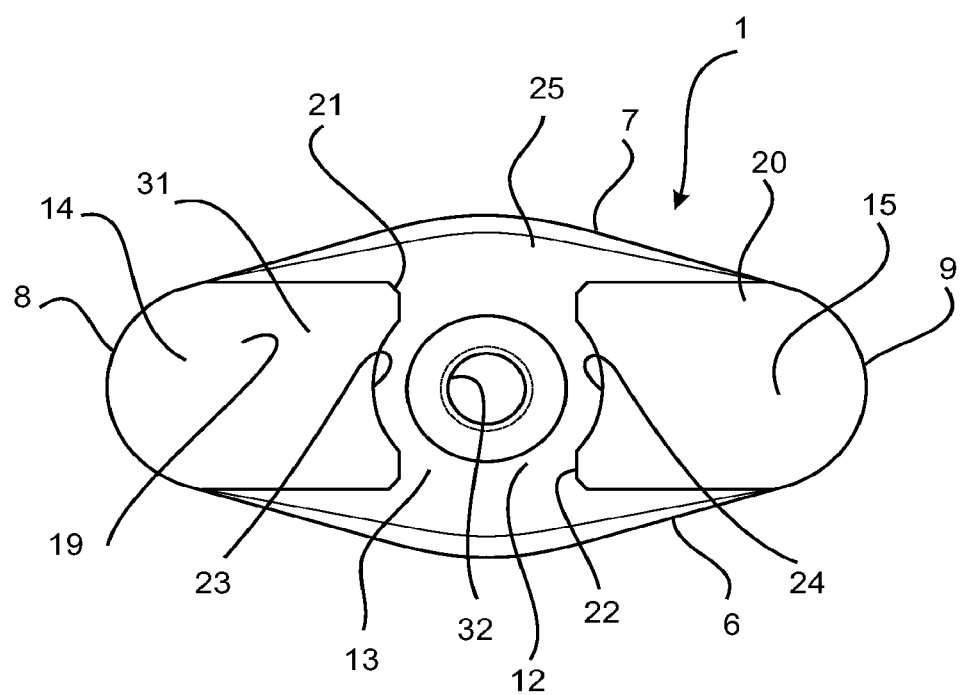
FIG. 7 is a plan view of the chain link of FIG. 5.
Figure 8:
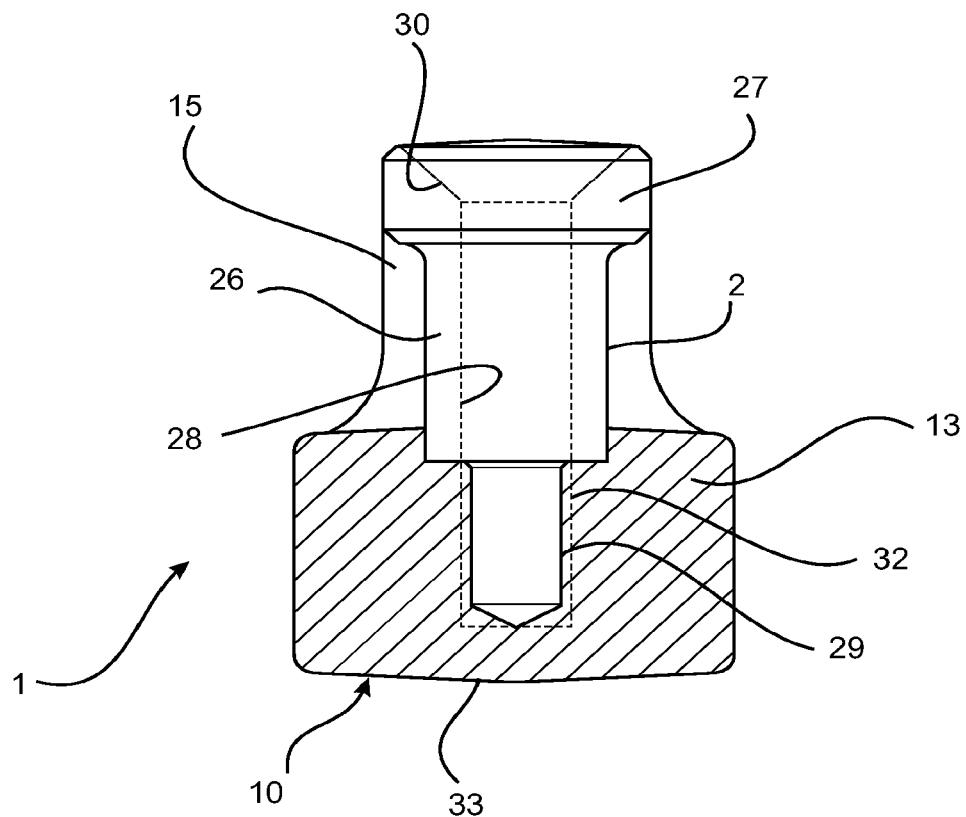
FIG. 8 is a cross section view of the chain link of FIG. 4 in the direction of line A-A of FIG. 4.

As best illustrated in FIG. 7, the first and second arcuate or curved arms 14, 15 terminate at ends 21, 22 to define the opening 12 in the top surface 31 of the body. Each terminal end 21, 22 has a respective curved recess 23, 24 provided therein such that the opening 12 has a substantially circular profile. The traction block portion 13 has a threaded aperture 32 provided substantially vertically therein, and located substantially congruent with recess 25 and opening 12, and arranged to receive a threaded bolt 29 (see FIG. 4) therein as will be described in further detail below.

The link member of the present invention can be provided in various sizes and shapes but in the embodiment described herein, the curved surface segments 19, 20 have a radius of curvature of 11 mm in the vertical plane and a radius of curvature of 31.5 mm in the horizontal plane. The body has curved edges and has dimensions of 103 mm length, 69 mm height and 51 mm at its widest width i.e. at the widest portion of the traction block portion 13. The terminal ends 21, 22 have a separation of 24 mm. The first and second arcuate or curved arms 14, 15 have a length of 31 mm. The traction block portion 13 is dimensioned so that it is wider at the middle than at either end, with the widest dimension being 51 mm, and 31 mm as its smallest width. However, it will be understood that other dimensions can be used.

The dimensions are selected to optimise the depth of the traction block portion 13 and the widths of the arcuate or curved arms 14, 15 at the points at which the chain ring 3 is in contact, as these are the portions of the chain link 1 that suffer the most wear during use.

Figure 9A:
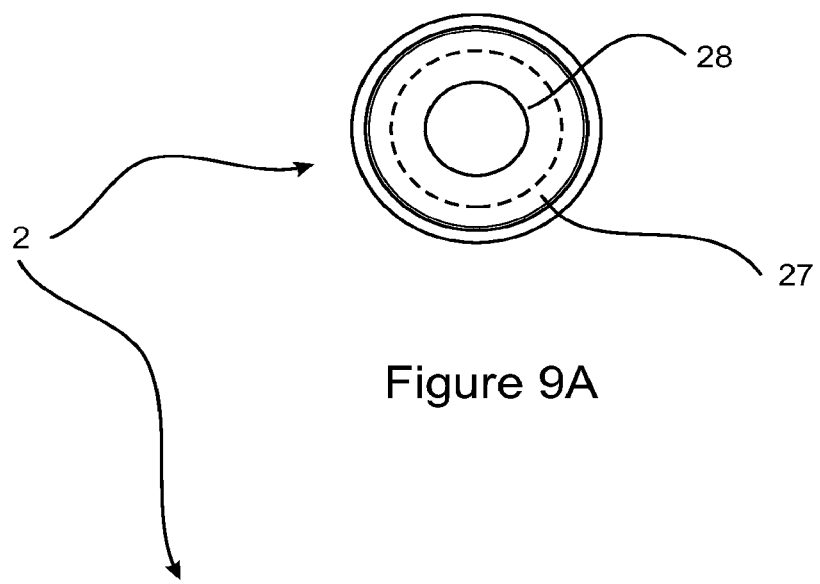
FIGS. 9A and 9B are plan and side views, respectively, of the insert fitted to the chain link in FIGS. 4 and 8.
Figure 9B:
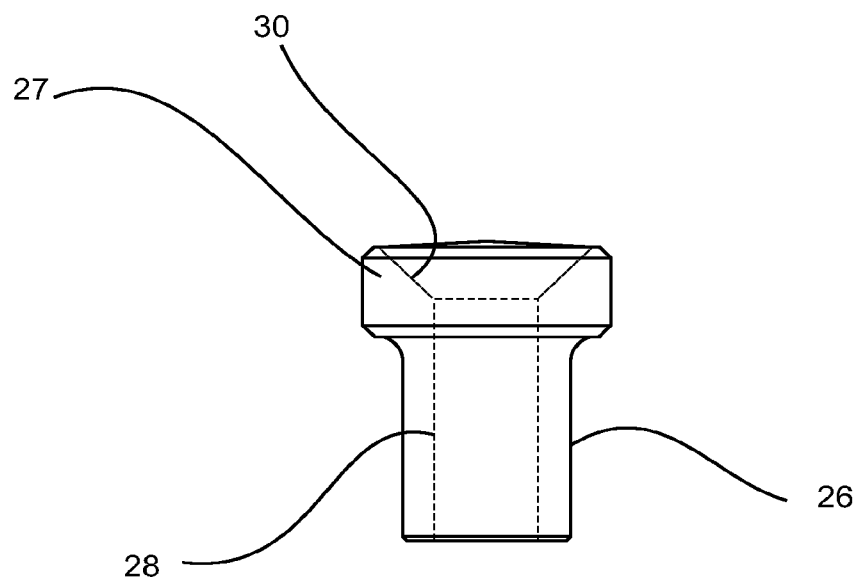

The sleeve member in the form of insert 2 is best depicted in FIGS. 9A and 9B and is arranged to be received through the opening 12, into the cavity 11 and recess 25 and, when in situ, defines first and second apertures 16, 17 in the cavity 11 (see FIG. 4) for receiving and retaining a circular chain ring 3 as will be described in further detail below.

With respect to FIGS. 9A and 9B the insert 2 comprises a shaft portion 26 and a cap portion 27 and a bore or aperture 28 running through its length. The bore 28 is dimensioned to receive the bolt 29 therein. The cap portion 27 includes a tapered recess 30 to enable the bolt 29 to be countersunk when it is passes through the insert 2. In the embodiment described herein, the bolt 29 includes a tapered top and the tapered recess 30 is appropriately shaped and dimensioned to receive the head of the tapered bolt 29. The outer dimensions of the cap portion 27 are such that the cap portion 27 fits within the opening 12 and matches the curved surfaces 23, 24. The bolt 29 then passes through the insert 2 and mates with the threaded aperture 32 in the body of the chain link 1. This is best illustrated in FIG. 4.

The insert 2 can be inserted within the opening 12 and pushed downwards until it abuts with the recess 25 in the surface 18. The bolt 29 can then inserted through the bore 28 until a portion at its end distal end is received into the threaded aperture 32. The bolt 29 is then tightened so as to retain and secure the insert 2 in position.

Figure 4:
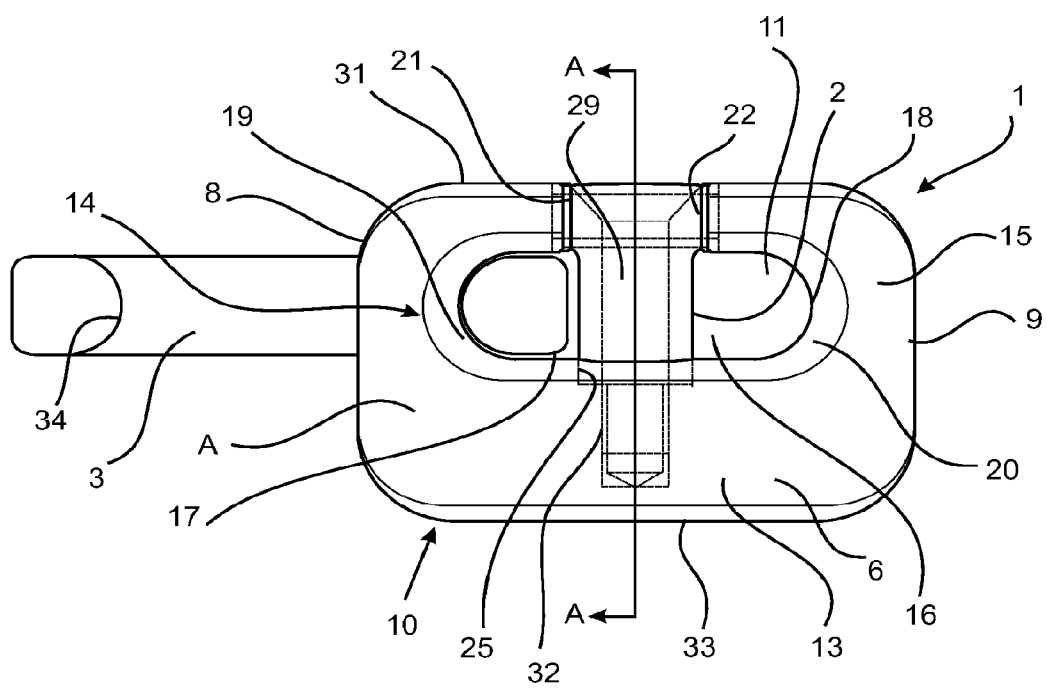
FIG. 4 is a schematic side view of a link member according to one embodiment of the present invention in the form of a chain link mounted on a chain ring and including a retaining member in the form of a screw threaded bolt that passes through a sleeve member in the form of an insert.
Figure 11:
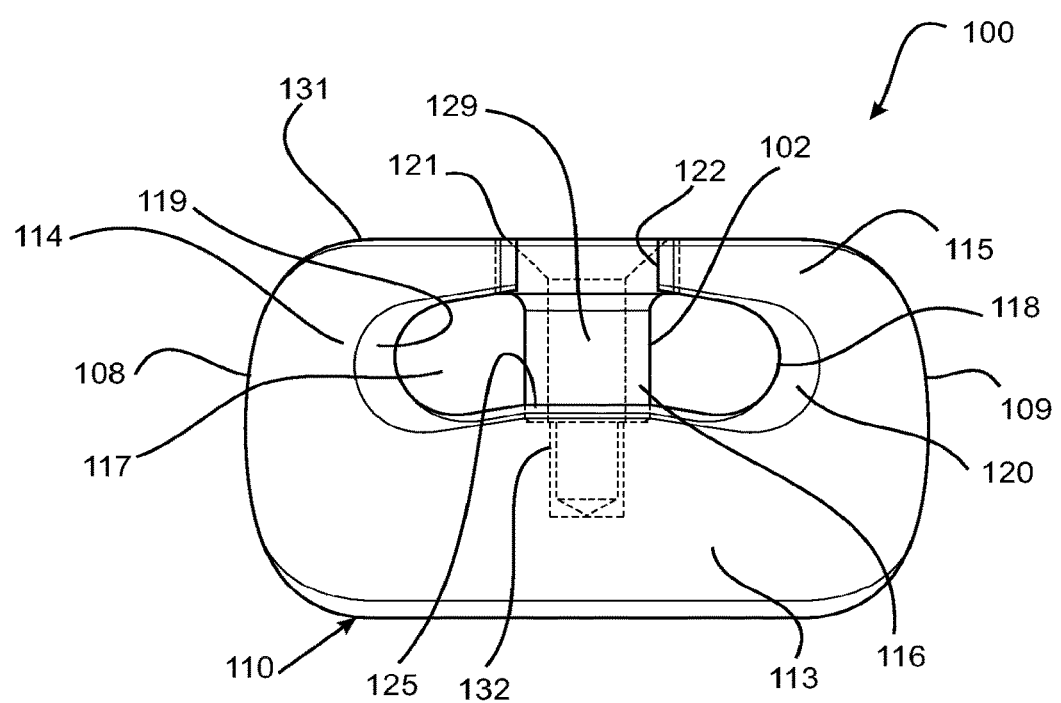
FIG. 11 is a schematic side view of a link member according to another embodiment of the present invention in the form of a chain link and including a retaining member in the form of a screw threaded bolt that passes through a sleeve member in the form of an insert.

FIG. 11 depicts another embodiment of a link member of the present invention in the form of a chain link 100 that is similar to the chain link 1 in FIG. 4. To show corresponding features numbering from FIG. 4 has been carried through to FIG. 11, save for the addition of one addition numeral e.g. feature 114 in FIG. 11 corresponds to feature 14 in FIG. 4. Key differences in the embodiment in FIG. 11 relative to FIG. 4 are:

a different shaped body that defines a different shaped internal surface 118 that includes a raised portion adjacent the recess 125 to receiving the insert 102;

a different shaped cavity with different shaped internal curved surface segments 119, 120 of respective first and second arcuate or curved arms 114, 115;

different shaped first and second apertures 116, 117 for receiving and retaining a circular chain ring (not shown);

the resulting cavity has a slightly curved oval cross-sectional profile.

The operation of the chain link in FIG. 11 is the substantially the same as the chain link in FIG. 4. However, the slightly curved oval cross sectional profile cavity results in different relative movement between the chain link and a chain ring, when attached thereto.

FIGS. 12A-12D depict another embodiment of a link member of the present invention generally indicated by the numeral 200, the cap portion 227 of the insert 202 includes a pair of opposing lugs 233, 234 extending horizontally therefrom. The terminal ends 221, 222 of the first and second arcuate or curved arms 214, 215 include respective recesses 235, 236 for receiving the lugs 233, 234. The lugs 233, 234 on the insert 202 will engage with the recesses and thus the insert 202 can cope better with stresses and pull loads applied in service that act to break the lugs, particularly after the wear of the material thickness of the traction block portion 213. Essentially, the end of life of the chain link 200 will be when the lugs 233, 234 break off.

Figure 13A:
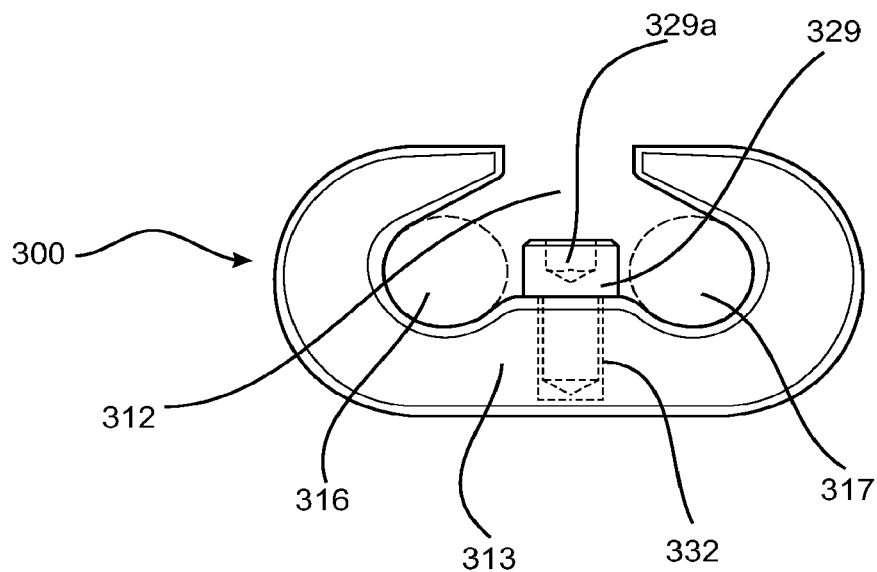
FIG. 13A is schematic side view of a link member according to another embodiment of the present invention in the form of a chain link in the closed position i.e. including a retaining member in the form of a bolt. This embodiment is specifically adapted to be positioned adjacent the side wall of the tyre, when in use.
Figure 13B:
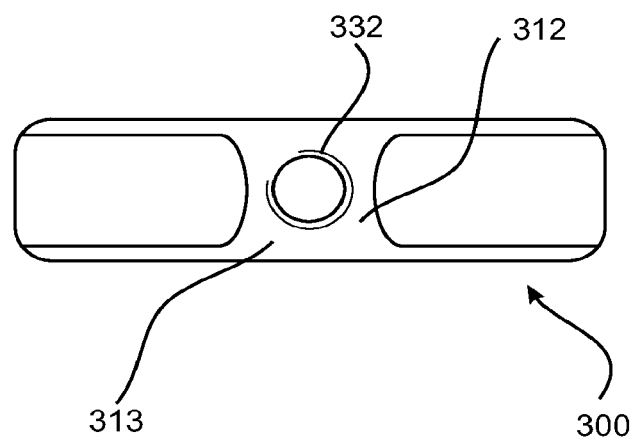
FIG. 13B is a plan view of the chain link in FIG. 13A in the open position i.e. without the bolt.

Another embodiment of the link member of the present invention is depicted in FIGS. 13A and 13B where a chain link generally indicated by the numeral 300 is provided that does not include a sleeve member and is designed for use as a side link, to lie adjacent the side wall of the tyre, when in use, as opposed to a traction link that is designed to be ground engaging.

Chain link 300 has a different shaped body with a narrower block portion 313 that has a more uniform cross sectional shape, relative to a traction link and may be made from different material relative to the traction block material used in other embodiments described herein. Chain link 300 also includes a retaining member in the form of a bolt member 329 including hex key cap 329a that can be used to close the chain link without the need of an insert. In this regard, the bolt member 329 acts to close the opening 312 and engage in bore 332 to create the two apertures 316, 317 for retaining respective chain rings (not shown) therein.

Figure 14A:
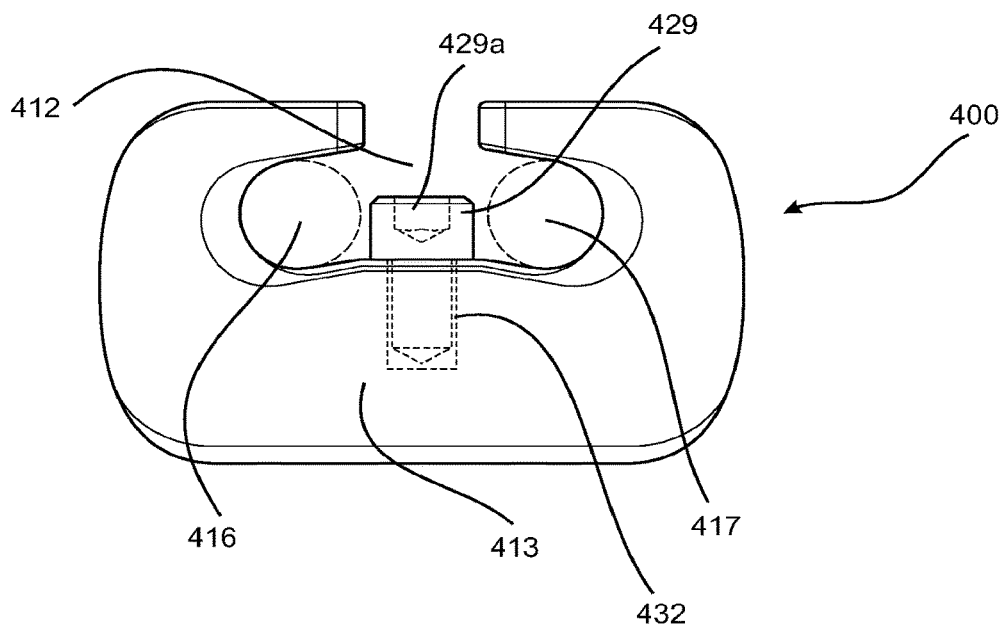
FIG. 14A is schematic side view of a link member according to another embodiment of the present invention in the form of a chain link in the closed position i.e. including a retaining member in the form of a bolt.
Figure 14B:
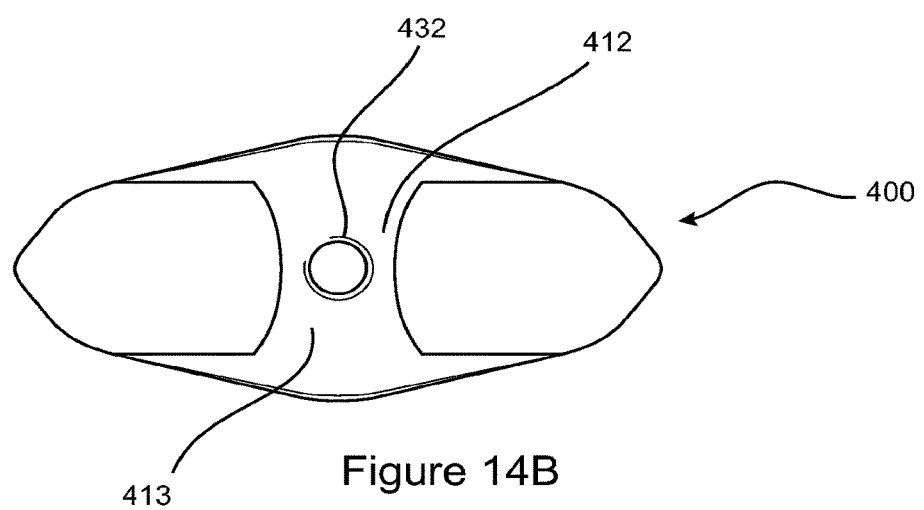
FIG. 14B is a plan view of the chain link in FIG. 14A in the open position i.e. without the bolt.

Another embodiment of the link member of the present invention is depicted in FIGS. 14A and 14B where a chain link generally indicated by the numeral 400 is provided that, like the chain link in FIGS. 13A and 13B, also does not include a sleeve member but is designed as a traction link that is designed to be ground engaging as per the embodiments in FIGS. 4, 11 and 12A.

Chain link 400 has a similar shaped body to other traction links described herein, particularly the link in FIG. 11. Chain link 400 also includes a retaining member in the form of a bolt member 429 including hex key cap 429a that can be used to close the chain link without the need of an insert. In this regard, the bolt member 429 acts to close the opening 412 and engage in bore 432 to create the two apertures 416, 417 for retaining respective chain rings (not shown) therein.

Figure 15:
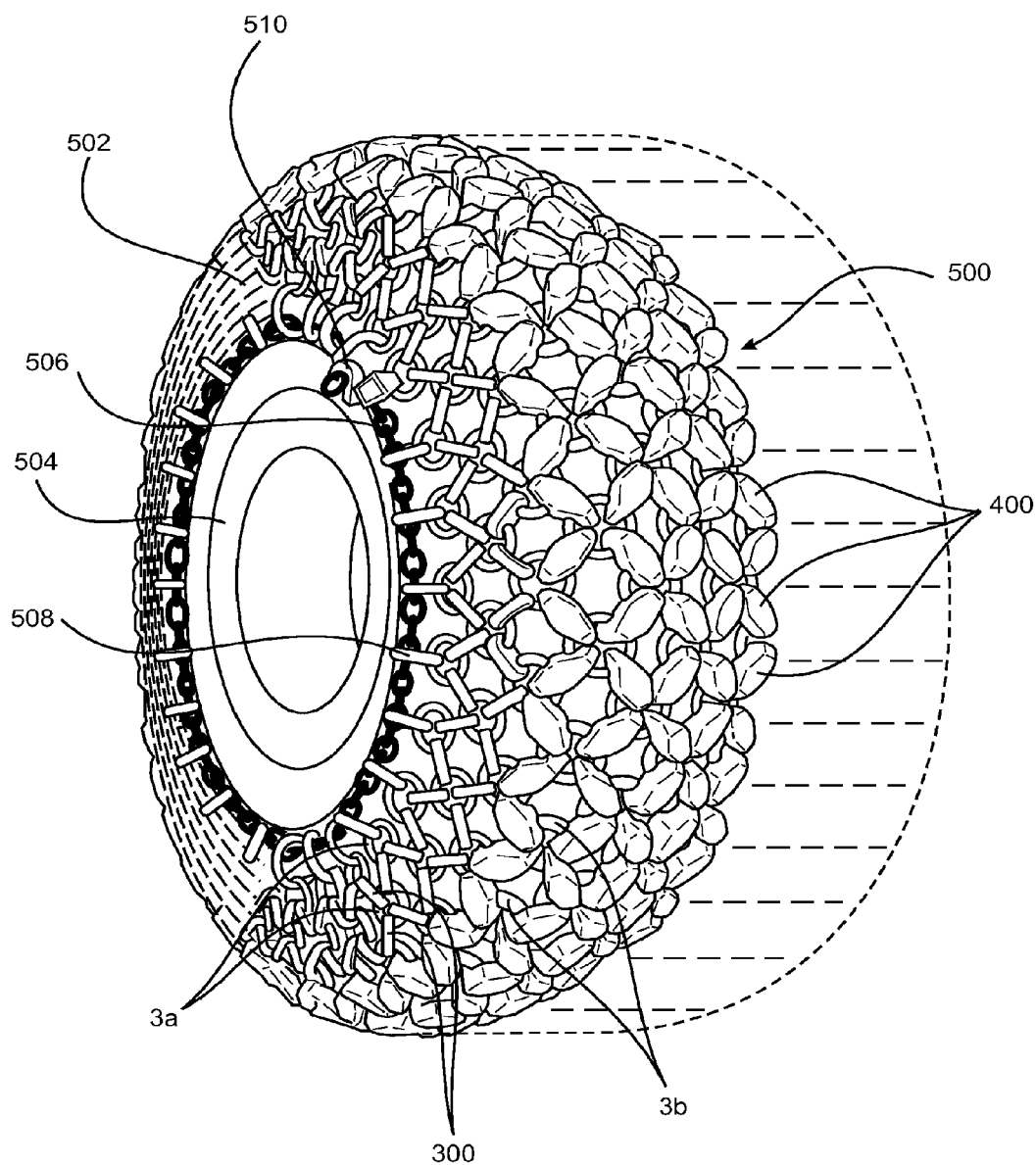
FIG. 15 is a perspective view of a tyre showing a partial view of a tyre chain according to one embodiment of the present invention fitted to a wheel assembly.

FIG. 15 depicts an embodiment of a tyre chain according to a fourth aspect of the present invention fitted to a tyre/wheel assembly according to an embodiment of a sixth aspect of the present invention.

The tyre chain, shown in part with the dotted line indicating its approximate extremity, and generally indicated by the numeral 500, is mounted on a tyre 502 that is in turn mounted on wheel 504. The tyre and wheel assembly is of the type commonly found on vehicles that operate in and around mine sites. The tyre chain 500 is comprised of a series of tyre chain units (see FIGS. 1 to 3) that in turn comprise a plurality of two types of chain links 300, 400 (see FIGS. 13A and 14A respectively) each attached to two different sized chain rings 3a, 3b (see FIG. 10A). Chain links 300 and chain rings 3a together form a mesh that lies adjacent to the side wall of the tyre 502 and are thus not designed to provide ground traction. Chain links 400 and chain ring 3b form a mesh that lies adjacent to the ground engaging portion of tyre 502 and thus are designed to provide wear material, ground traction and protect the tyre 502.

The tyre chain 500 is assembled to fit a predetermined tyre size and then is fitted to the tyre and tensioned for use via tensioning chain 506 that is threaded through links 508 that follow and pass around the side wall wheel. Once tensioned, the chain 506 can be retained in position via clamp 510. The tyre chain 500 can be removed by releasing chain 506 to provide access to the underside of the chain links 300, 400 and allow one or more chain links 300, 400 or chain rings 3a, 3b to be replaced or removed, as required.

The components of the present invention such as the chain rings and chain links can be made of any suitable material such as steel.

The invention claimed is:

1. A tire chain for a tire, the tire chain comprising
a plurality of first and second tire chain units, the first tire chain units comprising a first link member and the second tire chain units comprising a second link member, the first and second link members having one or more seamless ring elements received therein, the first tire chain units being arranged in a mesh and configured, in use, to lie adjacent to the side wall of the tire, the second tire chain units being arranged in a mesh and configured, in use, to lie adjacent to the ground engaging portion of the tire, wherein the second link members further comprise:
a body including a cavity for receiving a portion of the one or more seamless ring elements therein, the body also including a ground engaging portion incorporating wear material to provide a traction surface that, in use, contacts the ground and provides traction and tire protection; and
an opening for inserting at least one of the one or more seamless ring elements into the cavity,
the body further including a threaded bore provided in the ground engaging portion for receiving a retaining member for closing the opening and retaining the one or more seamless ring elements in the cavity;
wherein the first link members do not include the ground engaging portion.

2. The tire chain according to claim 1, wherein the retaining member is adapted to removably engage with the second link member.

3. The tire chain according to claim 1, wherein the threaded retaining member comprises a cap portion and a shaft portion, and wherein said cap portion of the retaining member is flush with the surface of the second link member when the retaining member is engaged therein.

4. The tire chain according to claim 1, wherein the retaining member comprises a cap portion and a shaft portion, and wherein the cap portion of the retaining member is counter sunk relative to the surface of the second link member when the retaining member is engaged therein.

5. The tire chain according to claim 3, wherein the cap portion includes a tool engaging portion.

6. The tire chain according to claim 5, wherein the tool engaging portion is compatible with a hex key or screw driver.

7. The tire chain according to claim 1, wherein the second link member further comprises a sleeve member for co-operating with the retaining member.

8. The tire chain according to claim 7, wherein the sleeve member extends at least partially into the body of the link member.

9. The tire chain according to claim 7, wherein the sleeve member is an elongate body having a bore provided along its length, said bore being adapted to receive the retaining member therethrough.

10. The tire chain according to claim 7, wherein the sleeve member is adapted to removably engage with the second link member.

11. The tire chain according to claim 7, wherein the sleeve member is configured such that when the sleeve member is received in the body of the second link member it closes the opening for the one or more ring elements and, once the retaining member is inserted through the sleeve member the one or more ring elements are retained in the cavity.

12. The tire chain according to claim 7, wherein the sleeve member includes a countersunk portion such that when the retaining member is inserted to retain the one or more seamless ring elements in the cavity the retaining member is flush or countersunk from the surface of the second link member.

13. The tire chain according to claim 1, wherein the cavity in the second link member has an internal curved surface, portions of which define internal curved surface segments.

14. The tire chain according to claim 13, wherein the internal curved surface segments are curved in three dimensions to cooperate with the radius of curvature of the seamless ring element.

15. The tire chain according to claim 1, in which at least one of the one or more seamless ring elements engages with four second tire link members.

16. The tire chain according to claim 1, further including side wall links and a tensioning chain threaded through links so as that follow and pass around the side wall of the tire.

* * * * *